United States Patent
Kajimura

(10) Patent No.: US 9,288,370 B2
(45) Date of Patent: Mar. 15, 2016

(54) IMAGING APPARATUS AND AUDIO PROCESSING APPARATUS

(75) Inventor: Fumihiro Kajimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 13/296,916

(22) Filed: Nov. 15, 2011

(65) Prior Publication Data

US 2012/0133784 A1 May 31, 2012

(30) Foreign Application Priority Data

Nov. 26, 2010 (JP) ................................. 2010-264119

(51) Int. Cl.
*H04N 5/225* (2006.01)
*G11B 20/24* (2006.01)

(52) U.S. Cl.
CPC ................ *H04N 5/225* (2013.01); *G11B 20/24* (2013.01)

(58) Field of Classification Search
CPC ........... G11B 20/24; G11B 2020/1055; G11B 2020/10564; H04N 5/225; H04N 1/00119; H04N 21/233; H04N 21/2335; H04N 21/439; G03B 13/32; G03B 3/10; G02B 7/04; G02B 7/09
USPC ....................................................... 348/231.4
See application file for complete search history.

(56) References Cited

U.S. PATENT DOCUMENTS

| 6,784,933 B1* | 8/2004 | Nakai ............................. 348/302 |
| 8,379,110 B2* | 2/2013 | Masuda ...................... 348/231.4 |
| 2004/0172240 A1* | 9/2004 | Crockett et al. .............. 704/205 |
| 2006/0132624 A1* | 6/2006 | Yuyama ........................ 348/241 |
| 2008/0151062 A1* | 6/2008 | Okumura ................... 348/208.1 |
| 2008/0219470 A1* | 9/2008 | Kimijima ........................ 381/92 |
| 2008/0279393 A1 | 11/2008 | Saito |
| 2009/0147624 A1* | 6/2009 | Hara et al. ..................... 367/131 |
| 2010/0260354 A1* | 10/2010 | Ozawa ......................... 381/94.4 |
| 2010/0270954 A1* | 10/2010 | Ito et al. ........................ 318/116 |
| 2011/0022403 A1* | 1/2011 | Washisu et al. ............... 704/503 |
| 2011/0052139 A1* | 3/2011 | Oku .............................. 386/224 |
| 2011/0069946 A1* | 3/2011 | Honjo et al. .................. 396/135 |
| 2011/0096206 A1* | 4/2011 | Okazaki ....................... 348/241 |

FOREIGN PATENT DOCUMENTS

| JP | 2001-344000 A | 12/2001 |
| JP | 2003-233947 A | 8/2003 |
| JP | 2004-023502 A | 1/2004 |
| JP | 2006-270591 A | 10/2006 |
| JP | 2006-279185 A | 10/2006 |
| JP | 2006-287387 A | 10/2006 |
| JP | 2008-053802 A | 3/2008 |
| JP | 2010-118975 A | 5/2010 |
| KR | 10-2007-0004806 A | 1/2007 |

* cited by examiner

*Primary Examiner* — Amy Hsu

(74) *Attorney, Agent, or Firm* — Canon USA Inc. IP Division

(57) ABSTRACT

An audio signal acquired by an audio acquisition unit during a predetermined period from when a drive signal has been output is analyzed, and a noise reduction period is determined based on a specific frequency component included in the audio signal of the predetermined period. The noise generated in the noise reduction period is then reduced from the audio signal acquired by the audio acquisition unit.

17 Claims, 12 Drawing Sheets

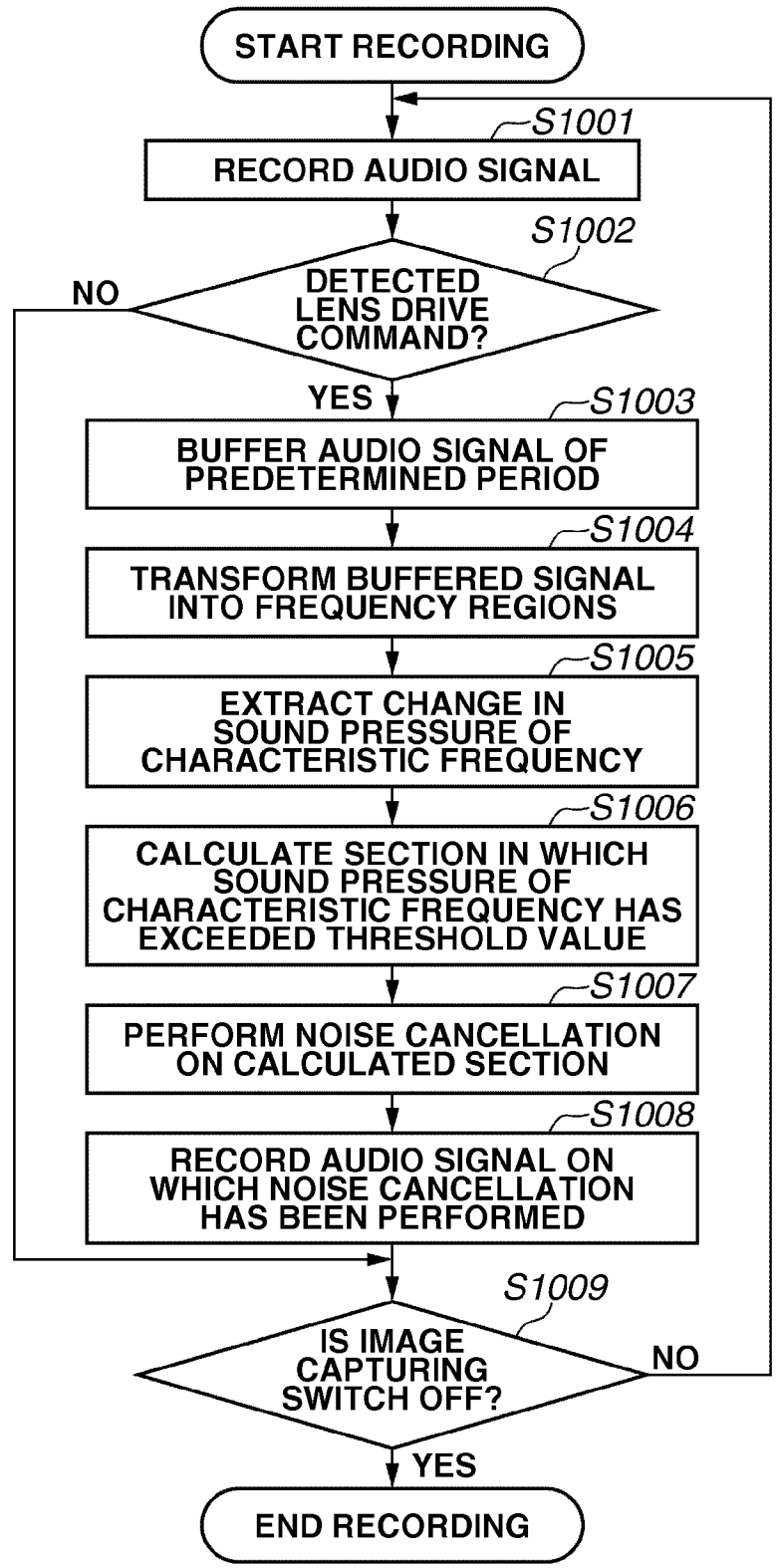

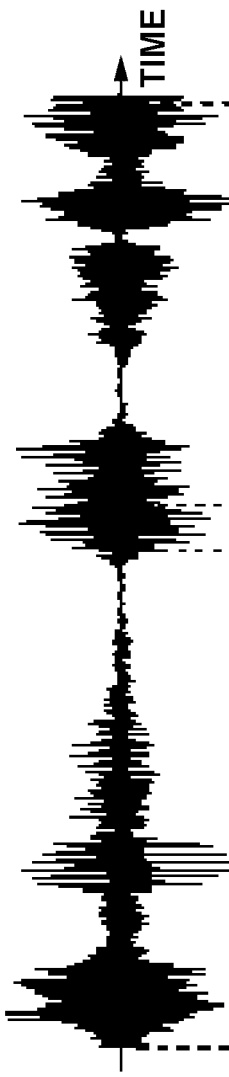
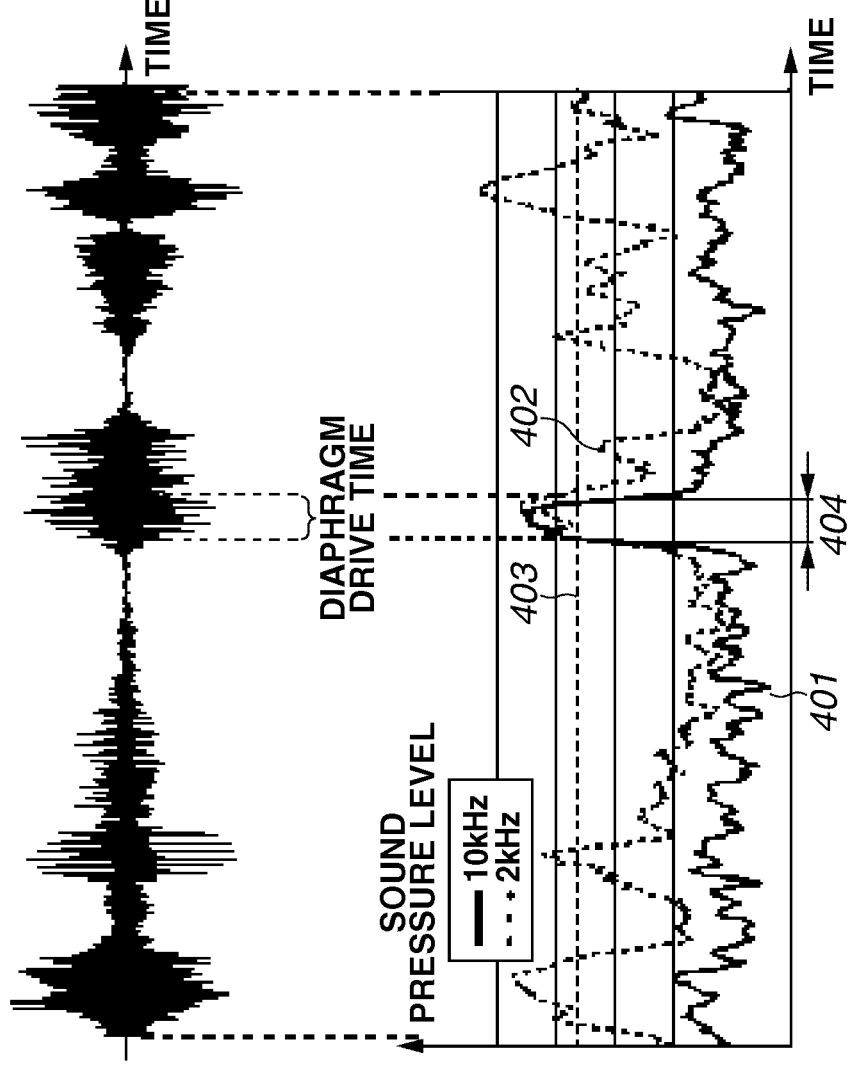
FIG.4A AUDIO SIGNAL
FIG.4B SOUND PRESSURE OF EXTRACTED FREQUENCY COMPONENTS

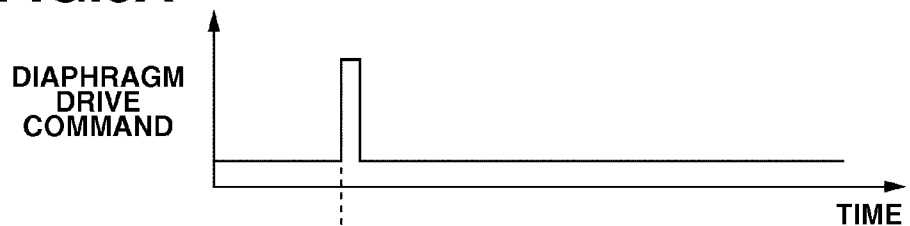
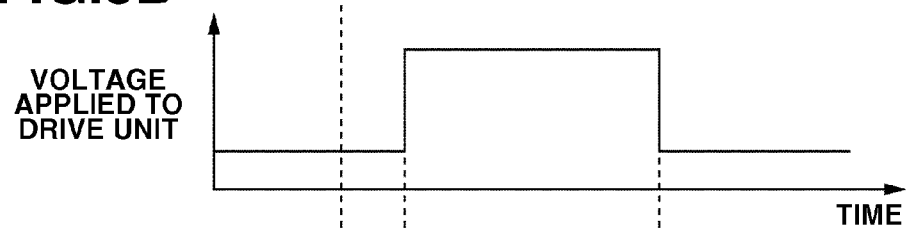
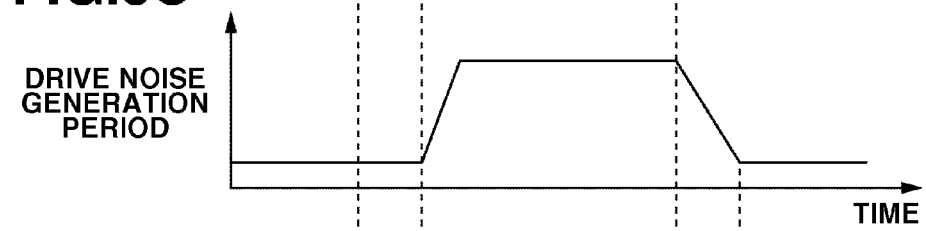
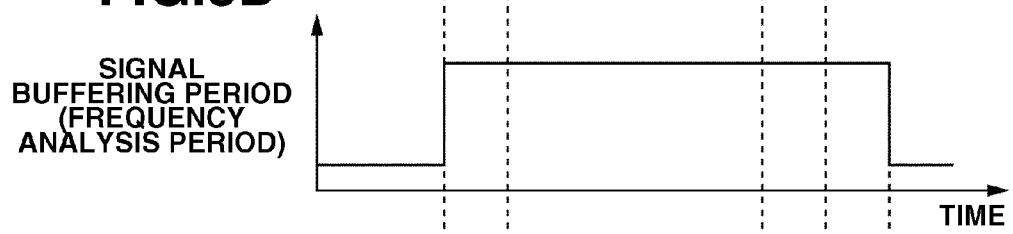
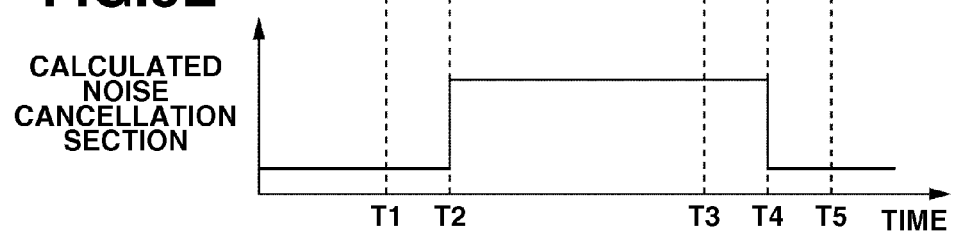

LEARNING SECTION 1 | NOISE CANCELLATION SECTION | LEARNING SECTION 2

LEARNING SECTION 1 | NOISE CANCELLATION SECTION | LEARNING SECTION 2

FILL IN BY PERFORMING PREDICTION BASED ON PREVIOUS AND SUBSEQUENT SIGNALS

LEARNING SECTION 1 | NOISE CANCELLATION SECTION | LEARNING SECTION 2

FIG.7

| TYPE OF LENS | OBJECT TO BE DRIVEN | LENGTH OF SECTION TO BE ANALYZED (msec) | CHARACTERISTIC FREQUENCY (Hz) | SOUND PRESSURE THRESHOLD VALUE (dB) |
|---|---|---|---|---|
| LENS A | DIAPHRAGM | 100 | 10000 | 40 |
| | FOCUS | 300 | 12000 | 38 |
| LENS B | DIAPHRAGM | 60 | 10000 | 40 |
| | FOCUS | 250 | 11000 | 42 |
| | ZOOM | 900 | 9000 | 41 |

LENS DRIVEN BY DC MOTOR

LENS DRIVEN BY ULTRASONIC MOTOR

IMAGING APPARATUS AND AUDIO PROCESSING APPARATUS

BACKGROUND OF THE INVENTION

1. Field of the Invention

The present invention relates to an imaging apparatus and an audio processing apparatus.

2. Description of the Related Art

There is a digital camera on market which includes a function for capturing moving images and recording audio signals, in addition to capturing still images. When capturing a moving image, a capturing state of the digital camera changes, so that a drive unit of the digital camera operates to drive a focus lens, or to drive a diaphragm mechanism in response to a change in brightness. The operation of the drive unit thus generates noise in the audio signal being recorded. To solve such a problem, there is a technique for reducing such drive noise.

Japanese Patent Application Laid-Open No. 2006-279185 discusses an imaging apparatus that performs a spectral subtraction method which is one method of cancelling noise. When a user operates on a zoom key for driving a zoom lens of the imaging apparatus employing such a method, the image apparatus performs noise cancellation on the audio signal input through a microphone in synchronization with driving of a zoom lens drive motor.

Further, Japanese Patent Application Laid-Open No. 2006-287387 discusses a technique for executing noise cancellation as described below. A reference microphone is placed near a drive motor that generates the drive noise. When the drive noise input to the reference microphone exceeds a predetermined level, noise cancellation is performed. Since the noise is detected based on the signal input to the reference microphone, a time lag between timing at which a drive signal is transmitted to the drive motor, and timing at which the drive noise is generated by actually driving the drive motor, is reduced.

Furthermore, Japanese Patent Application Laid-Open No. 2001-344000 discusses a technique for accurately detecting sudden noise that is generated in a communication apparatus such as a cellular phone which encodes and transmits the audio signal. More specifically, the audio signal acquired in performing communication is divided into frames of a predetermined time length, and the signal for each frame is then transformed to frequency domains. The change in the signal level is then monitored for each frequency domain, so that the sudden noise is detected.

However, it is necessary for the noise cancellation technique that cancels the noise in the audio signal to accurately determine a section in which noise cancellation is to be performed. The technique discussed in Japanese Patent Application Laid-Open No. 2006-279185 determines the section in which noise processing is to be performed according to timing of the zoom key operation. If the timing signal is imprecise, noise processing cannot be accurately performed.

Further, it is necessary in the technique discussed in Japanese Patent Application Laid-Open No. 2006-287387 to use a separate reference microphone for acquiring the noise, in addition to the main microphone for inputting the audio signal. Number of parts thus increases when employing such a technique. Furthermore, since it is necessary to continuously supply power to the reference microphone, power consumption increases in the digital camera.

Moreover, it is necessary in the technique discussed in Japanese Patent Application Laid-Open No. 2001-344000 to constantly transform the signals for each frame to the frequency domains while inputting the audio signals. Further, Fourier transformation which is commonly used in performing frequency domain transformation becomes a heavy load in terms of an amount of calculation.

SUMMARY OF THE INVENTION

The present invention is directed to an imaging apparatus and a drive noise cancellation apparatus that solves the above-described problems and appropriately cancels the noise.

According to the present invention, the section in which the drive noise is generated can be determined with a small calculation load, and the drive noise can thus be effectively cancelled.

According to an aspect of the present invention, an imaging apparatus includes an imaging unit configured to convert an optical image of an object to an image signal, an optical unit configured to impart an optical image of an object to the imaging unit, a drive unit configured to drive the optical unit, a control unit configured to output a drive signal and control the drive unit, an audio acquisition unit configured to acquire audio signals, a determination unit configured to analyze an audio signal acquired by the audio acquisition unit during a predetermined period from when the drive signal has been output, and determine a noise reduction period based on a specific frequency component included in the audio signal of the predetermined period, a noise reduction unit configured to reduce from an audio signal acquired by the audio acquisition unit, noise during a period determined by the determination unit, and a recording unit configured to record on a recording medium, an audio signal from which noise has been reduced by the noise reduction unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating a noise cancellation process according to a first exemplary embodiment.

FIGS. 4A and 4B illustrate examples of waveforms and specific frequency components of the audio signal in which the drive noise is generated.

FIGS. 5A, 5B, 5C, 5D, and 5E are timing charts illustrating noise cancellation processing sections.

FIG. 7 illustrates a table of analysis section length, characteristic frequency, and sound pressure threshold value for each optical element.

DESCRIPTION OF THE EMBODIMENTS

Various exemplary embodiments, features, and aspects of the invention will be described in detail below with reference to the drawings.

Figure 1:
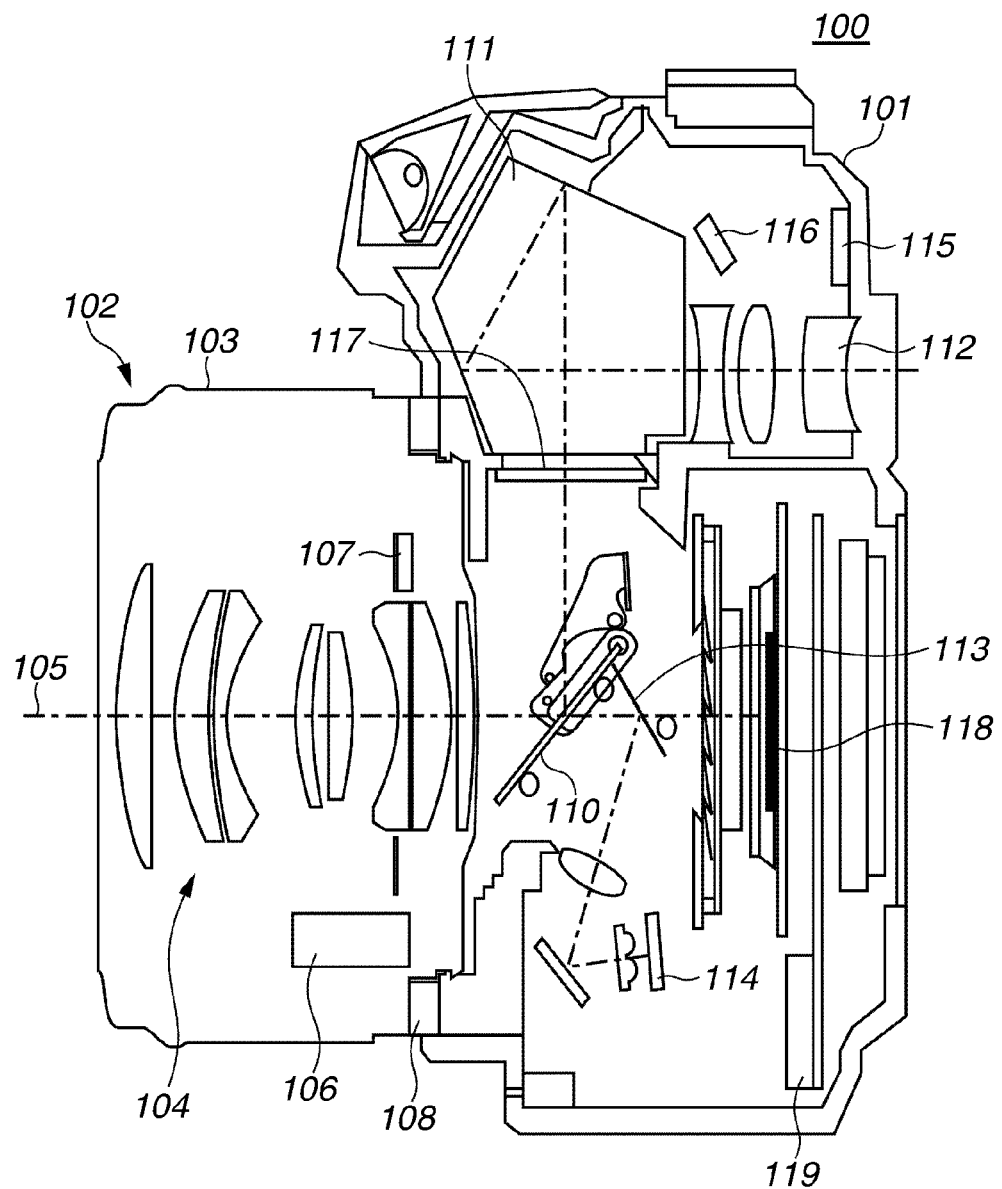
FIG. 1 is a center cross-sectional view illustrating an exemplary embodiment according to the present invention.

FIG. 1 is a center cross-sectional view illustrating a digital single lens reflex camera which is an exemplary embodiment of an imaging apparatus according to the present invention.

Referring to FIG. 1, a digital single lens reflex camera 100 according to an exemplary embodiment of the present invention includes a camera body 101 and an image-taking lens 102. The image-taking lens 102 includes inside a lens barrel 103 an imaging optical system 104 having an optical axis 105. The imaging optical system 104 includes a focus lens group, a camera-shake correction lens unit, a diaphragm mechanism, and an optical system drive unit 106 that drives the above-described components. Further, the imaging optical system 104 includes a lens control unit 107 which controls the optical system drive unit 106. The imaging optical system 104 is electrically connected to the camera body 101 at a lens mount contact 108.

An object optical image entering from front of the image-taking lens 102 passes through the optical axis 105 and enters the camera body 101. A main mirror 110 formed of a half mirror reflects a portion of incident light, and the reflected light is formed as an image on a focusing screen 117. The user or a photographer can visually recognize from an eye-piece lens 112 via a pentagonal prism 111 the optical image formed on the focusing screen 117. Such a configuration thus forms an optical view finder.

An automatic exposure (AE) sensor 116 detects the brightness of the optical image formed on the focusing screen 117. Further, the object optical image that has been transmitted through the main mirror 110 is reflected by a sub-mirror 113, and enters an auto-focus (AF) sensor 114. An output of the AF sensor 114 is used in performing focus detection of the object image. The AE sensor 116 detects an amount of exposure of the entire focusing screen 117, or a portion or a plurality of portions of the focusing screen 117.

If the user operates on a release button (not illustrated) in the camera main body 101, an instruction is issued to start image capturing. The main mirror 110 and the sub-mirror 113 then retract from an imaging light path, so that the object optical image enters an image sensor 118.

The detection results of the AF sensor 114 and the AE sensor 116, and the output from the image sensor 118 are supplied to a camera control unit 119. The camera control unit 119 thus controls the entire camera 100 according to the supplied signals.

When capturing the moving image, a microphone 115, i.e., an audio input unit, captures external sounds, converts the captured sounds to the audio signal, and provides the audio signal to the camera control unit 119. The audio signal is recorded in synchronization with an image signal output from the image sensor 118.

Figure 2:
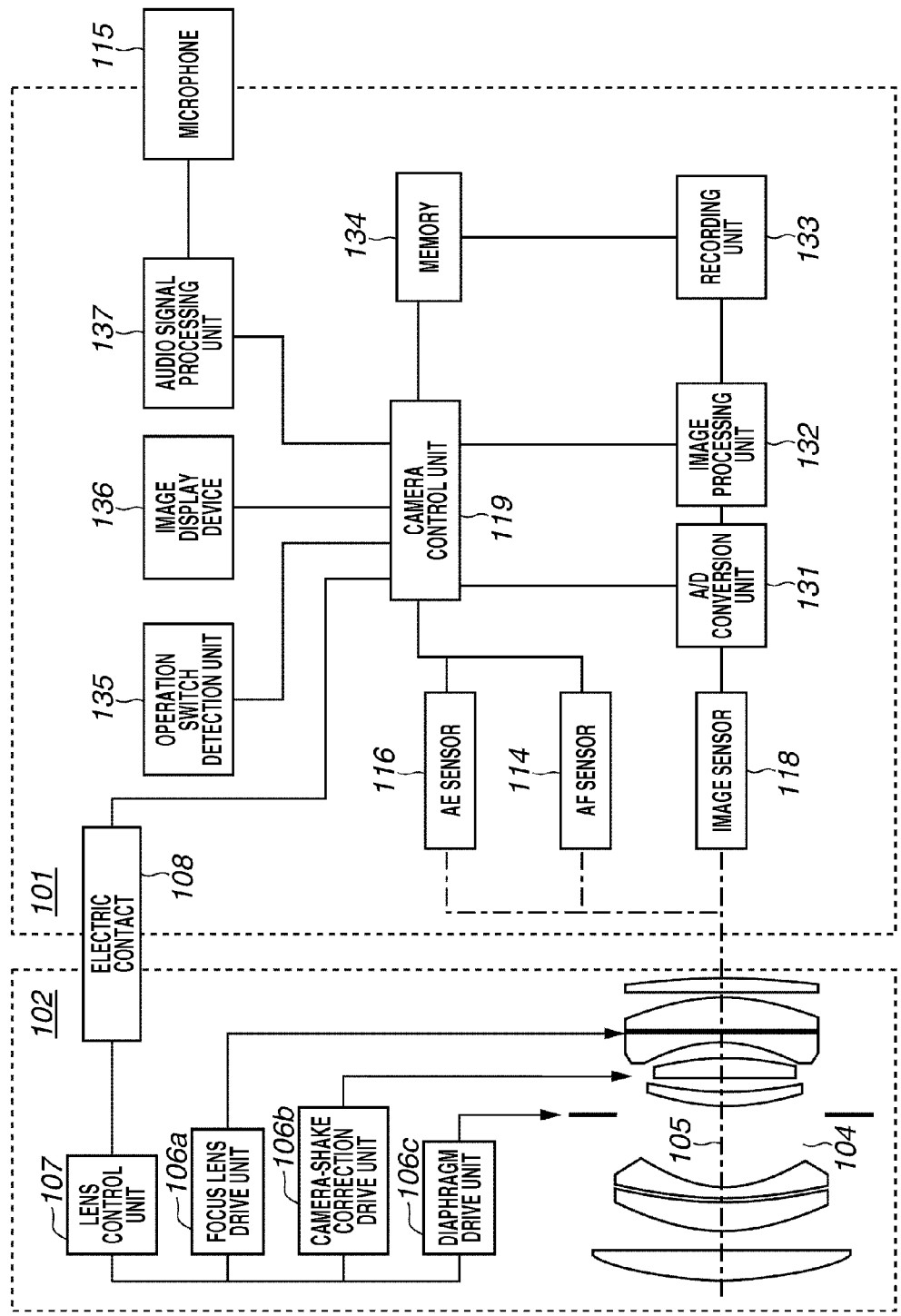
FIG. 2 is a block diagram illustrating a schematic configuration of the exemplary embodiment illustrated in FIG. 1.

FIG. 2 is a block diagram illustrating a schematic configuration of the digital single lens reflex camera 100. Referring to FIG. 2, the digital single lens reflex camera 100 includes an imaging system, an image processing system, an audio processing system, a recording/playback system, and a control system. The imaging system includes the imaging optical system 104 and the image sensor 118. The image processing system includes an analog/digital (A/D) conversion unit 131 and an image processing unit 132. The audio processing system includes the microphone 115 and an audio signal processing circuit 137. The recording/playback system includes a recording unit 133 and a memory 134. The control system includes the optical system drive unit 106, the lens control unit 107, the camera control unit 119, the AF sensor 114, the AE sensor 116, and an operation switch detection unit 135. The optical system drive unit 106 includes a focus lens drive unit 106a, a camera shake correction drive unit 106b, and a diaphragm drive unit 106c.

The imaging system is an optical processing system which uses the imaging optical system 104 to form an image of the light coming from the object on an imaging plane of the image sensor 118. When preliminary imaging operations such as aiming is being performed, a portion of the light flux is guided to the AF sensor 114, i.e., the focus detection unit, via a mirror disposed in the main mirror 110. The control system appropriately adjusts the imaging optical system 104, so that an appropriate amount of light from the object is received by the image sensor 118, and the object image is formed in the vicinity of the image sensor 118 as will be described below.

The A/D conversion unit 131 digitizes the image signal output from the image sensor 118 and inputs the digitized image signal to the image processing unit 132. The image processing unit 132 then processes the image data received from the A/D conversion unit 131. The image processing unit 132 includes a white balance circuit, a gamma correction circuit, and an interpolation calculation circuit which performs interpolation calculation for increasing resolution.

The audio signal processing unit 137 in the audio processing system performs an appropriate process on the signal output from the microphone 115, and generates the audio signal to be recorded. The recording unit to be described below records the generated audio signal associated with the image data.

The recording unit 133 outputs the image data to the memory 134, and generates and stores the image data of the image to be output to an image display device 136. Further, the recording unit 133 uses a predetermined method and compresses the image data, moving image data, and audio data. The recording unit 133 records the compressed data in the recording medium.

The camera control unit 119 generates and outputs timing signals in the image capturing operation. The AF sensor 114, i.e., the focus detection unit, detects a focus state of the object, and the AE sensor 116, i.e., an exposure detection unit, detects the brightness of the object. The lens control unit 107 adjusts focusing, zooming, and the diaphragm of the imaging optical system 104, according to the control signal output from the camera control unit 119.

The control system controls each of the imaging system, the image processing system, and the recording/playback system, according to an operation from the outside. For example, the operation switch detection unit 135 detects that the user has pressed a shutter release button (not illustrated). The camera control unit 119 then controls driving of the image sensor 118, the operation of the image processing unit 132, and the compression process to be performed by the recording unit 133, according to the detection result. Further, the camera control unit 119 controls information display performed by the optical finder and a liquid crystal monitor configuring the image display device 136.

The operation for adjusting the imaging optical system will be described below. The camera control unit 119 determines an appropriate focus position and diaphragm position according to the detection results of the AF sensor 114 and the AE sensor 116. The camera control unit 119 then supplies to the lens control unit 107 the control signal indicating control for driving the focus lens and the diaphragm to such positions. The lens control unit 107 causes the focus lens driving unit 106*a* and the diaphragm drive unit 106*c* to drive the focus lens and the diaphragm respectively according to the control signal from the camera control unit 119.

Further, the lens control unit 107 is connected to a camera shake detection sensor (not illustrated). When the digital single lens reflex camera 100 is in a camera shake correction mode, the lens control unit 107 controls the camera shake drive unit 106*b* according to the detection result of the camera shake detection sensor and thus reduces the camera shake.

When capturing the moving image, the main mirror 110 and the sub-mirror 113 retract from the light path passing thorough the optical axis 105 to the image sensor 118. The object light image thus does not enter the AF sensor 114 and the AE sensor 116. In such a case, the camera control unit 119 uses the drive amount of the focus lens drive unit 106*a* and the continuous image signals output from the image sensor 118 to adjust the focus state of the image optical system. The camera control unit 119 employs a focus detection method referred to as a hill-climbing method. Further, the camera control unit 119 uses the image signal output from the image sensor 118 to calculate the brightness of the object and thus adjusts the diaphragm.

The method for cancelling the drive noise of the imaging optical system 104 generated when recording the audio signal while capturing the moving image will be described below with reference to FIGS. 3 through 7. According to the present exemplary embodiment, it is assumed that the diaphragm drive unit 106*c* has been activated. FIG. 3 is a flowchart illustrating the noise cancellation process according to the present exemplary embodiment.

FIGS. 4A and 4B illustrate examples of the waveforms of the audio signal and the change in the sound pressure level of extracted frequencies. FIG. 4A illustrates the example of the waveform of the audio signal acquired by the microphone 115. Referring to FIG. 4A, time is indicated on a horizontal axis, and a voltage level of the audio signal output from the microphone 115 is indicated on a vertical axis. FIG. 4B illustrates a change in the sound pressure of 10 kHz and 2 kHz frequency components of the audio signal illustrated in FIG. 4A. Referring to FIG. 4B, time is indicated on the horizontal axis, and a sound pressure level is indicated on the vertical axis.

FIGS. 5A through 5E illustrate timing charts for the diaphragm drive unit 106*c* to drive the diaphragm in the image-taking lens 102. FIG. 5A illustrates the timing chart for issuing a diaphragm drive command from the camera body 101 to the image-taking lens 102. FIG. 5B illustrates the timing chart for applying a drive voltage by which the diaphragm drive unit 106*c* actually drives the diaphragm. FIG. 5C illustrates the timing chart of a period during which the diaphragm drive unit 106*c* generates the drive noise. FIG. 5D illustrates the timing chart of a period in which the audio signal is buffered for a predetermined length of time, and frequency analysis is performed to determine a noise cancellation processing section. FIG. 5E illustrates the timing chart of the noise cancellation processing section calculated from the result of frequency analysis.

Referring to the flowchart illustrated in FIG. 3, when the user presses a moving image capturing switch (not illustrated) of the digital single lens reflex camera 100, the digital single lens reflex camera 100 starts capturing the moving image. The digital single lens reflex camera 100 also starts the sound recording operation at the same time.

In step S1001, the audio signal acquired by and output from the microphone 115 is stored in the memory 134 via the audio signal processing circuit 137 in synchronization with the video signal.

In step S1002, the camera control unit 119 determines whether there is a command that instructs driving of the optical system driving unit 106. For example, the command may be in a form of the user performing the diaphragm adjustment, or driving of a focus lens for focusing. If the drive command is not detected (NO in step S1002), the process proceeds to step S1009. In step S1009, the camera control unit 119 determines whether the moving image capturing switch is off. If the moving image capturing switch is on (NO in step S1009), the process returns to step S1001, and the camera control unit 119 continues to record the audio signal. On the other hand, if the moving image capturing switch is off (YES in step S1009), the camera control unit 119 ends the image capturing operation including the sound recording.

If the drive command is detected (YES in step S1002), the process proceeds to step S1003. In step S1003, the camera control unit 119 buffers the audio signal of a predetermined period starting from issuing of the drive command as illustrated in FIG. 5D. Referring to FIG. 4A, diaphragm drive noise is mixed into the audio signal captured in the diaphragm drive period among the buffered audio signal.

In step S1004, the camera control unit 119 divides into frames the audio signal buffered for a predetermined time starting from issuing of the lens drive command. The camera control unit 119 then consecutively performs Fourier transformation on each frame and transforms each frame to frequency domains. In step S1005, the camera control unit 119 extracts from the audio signal transformed into the frequency domains, the change in the sound pressure of a characteristic frequency of the diaphragm drive noise. The example of the waveforms illustrated in FIG. 4B illustrates that a sound pressure change in a 10 kHz component 401 indicates a drive noise component, and a sound pressure change in a 2 kHz component 402 indicates the component of the audio signal acquired from the object. For ease of understanding, FIG. 4B also illustrates the sound pressure change of the drive noise component for the periods other than the buffering period.

Referring to FIG. 4B, the sound pressure of the 2 kHz component 402 greatly changes with respect to time, so that it is difficult to determine the diaphragm drive time from the change. On the other hand, the sound pressure does not change greatly for the 10 kHz component 401 during the period in which there is only the sound of the object, and greatly changes during the diaphragm drive period.

According to the present exemplary embodiment, the diaphragm drive period is described to represent the lens drive period. However, this is not a limitation, and other elements may be driven. Further, the 10 kHz component is described above as the characteristic frequency component. However, this is an example, and the characteristic frequency component may be of other frequencies as long as it is in the frequency domain that is greatly included in the drive noise and not in the audio signal acquired from the object. The lens control unit 107 stores as a data table illustrated in FIG. 7 the characteristic frequency and a determination threshold value for each image-taking lens 102 and each driven elements in the image-taking lens 102, and transfers the data to the camera control unit 119 as necessary.

In step S1006, the camera control unit 119 calculates a section in which the sound pressure of the characteristic frequency extracted in step S1005 exceeds the predetermined threshold value. According to the present exemplary embodiment, the camera control unit 119 calculates the section in which the sound pressure of the 10 kHz component 401 exceeds a threshold value 403 illustrated in FIG. 4B, and determines a noise cancellation processing section 404 in which noise cancellation is to be performed.

Figure 8A:
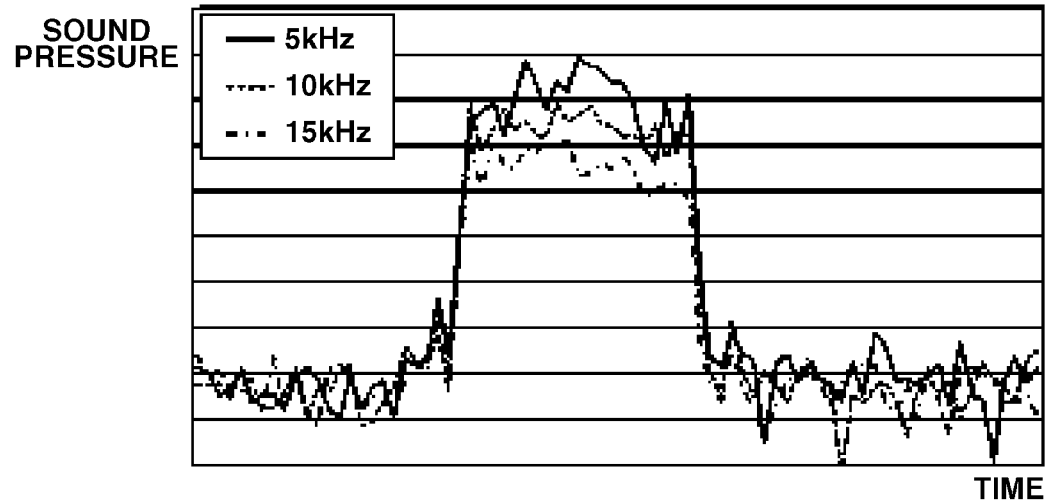
FIGS. 8A and 8B illustrate examples of the drive noise for each drive unit.
Figure 8B:
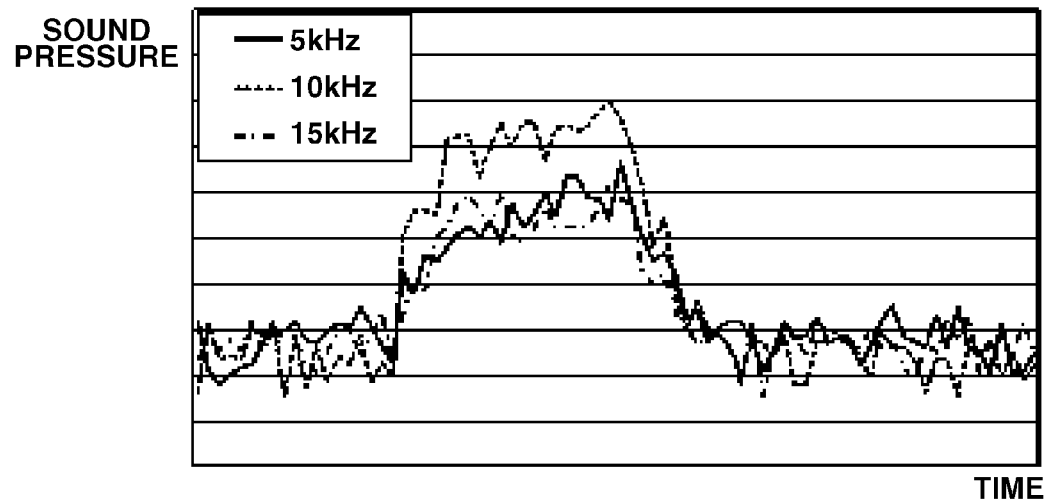

The characteristic frequency domain of the drive noise is different for each type of lens and the drive operation. Further, the generated sound pressure level is also different. For example, FIGS. 8A and 8B illustrate 5 kHz, 10 kHz, and 15 kHz components of two types of lens drive noises generated when the focus lens is driven using different actuators. Referring to FIGS. 8A and 8B, the sound pressure level is indicated on the vertical axis, and the time is indicated on the horizontal axis. FIG. 8A illustrates the change in the sound pressure for each frequency of the drive noise generated when the lens is driven using a direct current (DC) motor as the actuator. FIG. 8B illustrates the change in sound pressure for each frequency of the drive noise generated when the lens is driven using an ultrasonic motor as the actuator.

In the case where the DC motor is used, each of the 5 kHz, 10 kHz, and 15 kHz components are uniformly included in the drive noise. On the other hand, in the case where the ultrasonic motor is used, the 10 kHz bandwidth is greatly included, whereas the 5 kHz and 15 kHz components are less included as compared to the 10 kHz component in the drive noise. Further, the sound pressure level of the drive noise generated when using the ultrasonic motor is lower than the sound pressure level of the drive noise generated when using the DC motor, in each frequency domain.

As described above, it is desirable to set the threshold value in the frequency domain in which the sound of the object is not included, to clearly separate the object sound from the drive noise. However, since the characteristic frequency and the sound pressure level differ according to the type of lens and the drive operation, it is desirable to set the threshold value for each lens type and drive operation. The threshold values 403 are thus stored in the lens control unit 107 as value that are different for each lens type and drive operation as illustrated in FIG. 7, and are transferred to the camera control unit 119 as necessary.

In step S1007, the camera control unit 119 performs noise cancellation with respect to the noise cancellation processing section 404 calculated in step S1006. The noise cancellation method will be described in detail below.

In step S1008, the camera control unit 119 controls the recording device 133 to record the audio signal that has been subjected to noise cancellation in step S1007, in synchronization with the captured moving image. The camera control unit 119 directly records the buffered audio signals other than those in the noise cancellation processing section, without performing noise cancellation processing thereon.

In step S1009, the camera control unit 119 determines whether the moving image capturing switch has been turned off. If the moving image capturing switch has been turned off (YES in step S1009), the camera control unit 119 ends recording the sound. If the moving image capturing switch has not been turned off (NO in step S1009), the camera control unit 119 continues recording the audio signal.

The relationship between the diaphragm drive time and the frequency transformation section, or the frequency analysis section, will be described below with reference to the timing charts illustrated in FIGS. 5A-5E.

Referring to FIG. 5A, the camera control unit 119 issues the diaphragm drive command at time T1. The audio signal of a predetermined time between T1 and T5 illustrated in FIG. 5E is then buffered. The buffering period is different depending on the type of the image-taking lens 102 and the elements that drive the image-taking lens 102, so that extra time is added previous and subsequent to the drive time in the buffering period.

The analysis section length which indicates the length of the buffering period is stored in the data table illustrated in FIG. 7. The data table is stored in the memory within the image-taking lens 102, and when the image-taking lens 102 is connected to the camera body 101, the data table is transferred to the control unit 119 or the memory 134 and stored. Further, when the image-taking lens 102 is attached to the camera body 101, the optical system drive unit 106 may drive each lens element, measure the drive time, and determine the buffering period from the measured time. Furthermore, the data table to be applied may be determined by storing in the memory 134 in the camera body 101 the data table for each type of image-taking lens 102, and identifying the type of the attached image-taking lens.

Referring to FIG. 5B, the lens control unit 107 causes the diaphragm drive unit 106c to drive the diaphragm at time T2, according to the diaphragm drive command received from the camera control unit 119. There is a time lag between issuing of the diaphragm drive command (i.e., at T1) and start of driving the diaphragm (i.e., at T2). The diaphragm drive unit 106c thus drives the diaphragm at time T2, so that the drive noise is generated.

At time T3, the drive voltage of the diaphragm drive unit 106c is lowered, and the diaphragm drive operation ends. However, there remains a reverberant sound of the drive noise generated due to driving the diaphragm, which continues to time T4 as illustrated in FIG. 5C. Buffering and frequency analysis are thus performed for the predetermined time length between T1 and T5 in which the reverberant sound period is included, as illustrated in FIG. 5D. As a result, the correct drive noise generation period T2 to T4, including the time lag generated between issuing of the diaphragm drive command and actual start of driving the diaphragm and the time in which the reverberant sound noise remains, can be determined. A highly accurate noise cancellation can thus be performed.

Figure 6A:
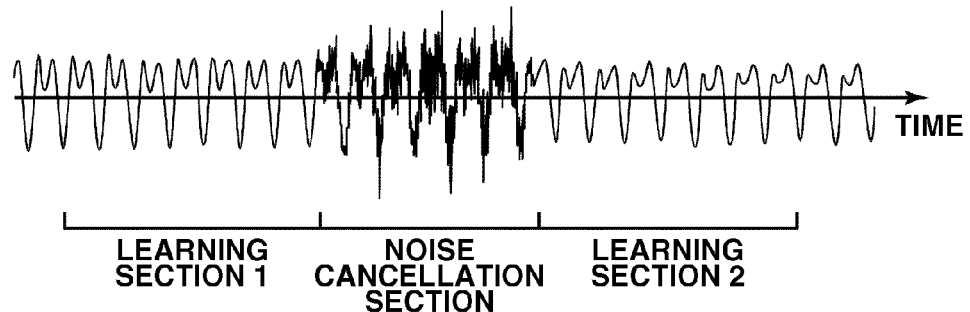
FIGS. 6A, 6B, and 6C illustrate a process for predicting the audio signal in the noise cancellation processing section.
Figure 6B:
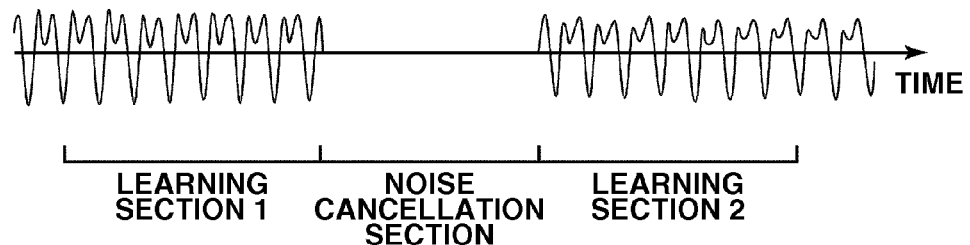
Figure 6C:
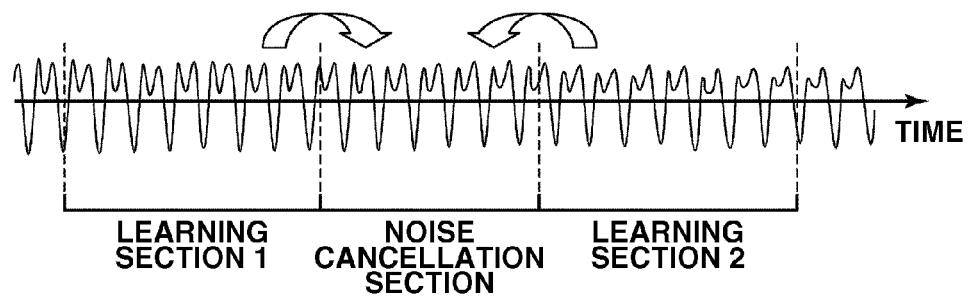

The noise cancellation process according to the present exemplary embodiment will be described below with reference to FIGS. 6A-6C. According to the present exemplary embodiment, the noise cancellation process employs a prediction process which uses the audio signals previous and subsequent to the drive noise generation period, to predict the audio signal during the drive noise generation period. FIGS. 6A, 6B, and 6C illustrate the audio signal waveforms in each processing procedure. Referring to FIGS. 6A-6C, the time is indicated on the horizontal axis, and the signal level is indicated on the vertical axis. FIG. 6A illustrates the audio signal from the object into which the drive noise is mixed. FIG. 6B illustrates the audio signal in the middle of performing the prediction process in the noise cancellation process. FIG. 6C illustrates the audio signal acquired after application of the prediction process.

Referring to FIG. 6B, the audio signal in the noise cancellation processing section, i.e., the audio signal into which the drive noise is mixed, is discarded in the prediction process. A learning operation and a prediction operation are then performed to interpolate the audio signal in the noise cancellation processing section using the signal acquired by the prediction operation.

According to the present exemplary embodiment, audio prediction includes derivation of a linear prediction coefficient (i.e., the learning operation) and signal prediction using the linear prediction coefficient (i.e., the prediction operation) to be described below.

In employing linear prediction, it is assumed that there is a linear combination relationship between the current signal and a finite number ("p" according to the present exemplary embodiment) of sample values adjacent to the current signal. Such a relationship is described below in equation (1).

$$x_t + \alpha_1 x_{t-1} + \ldots + \alpha_p x_{t-p} = \epsilon_t \quad (1)$$

In equation (1), $\epsilon_t$ is an uncorrelated random variable of an average value 0 and variance $\sigma^2$.

If equation (1) is transformed so that $x_t$ is to be predicted from a past value, equation (2) is acquired.

$$x_t = -\alpha_1 x_{t-1} - \ldots - \alpha_p x_{t-p} + \varepsilon_t \quad (2)$$

$$= \sum_{i=1}^{p} \alpha_i x_{t-i} + \varepsilon_t$$

According to equation (2), if $\epsilon_t$ is sufficiently small, the current value is expressed by a linear sum of neighborhood p values. Further, if an approximation of $x_t$ obtained using the above-described prediction operation is sufficiently appropriate, $x_{t+1}$ can also be obtained as the linear sum of neighborhood p values.

As described above, if $\epsilon_t$ can be set sufficiently small, values can be sequentially predicted, and the signal can be acquired. The linear prediction coefficient $\alpha_i$ which minimizes $\epsilon_t$ is thus to be acquired. According to the present exemplary embodiment, the operation for acquiring $\alpha_i$ which minimizes $\epsilon_t$ will be referred to as the learning operation.

The linear prediction coefficient $\alpha_i$ can be acquired by minimizing $\Sigma \epsilon_t^2$ in a learning section in which the learning operation is performed. When learning start time is $t_0$ and learning end time is $t_1$, equation (3) is acquired.

$$\sum_{t=t_0}^{t_1} \varepsilon_t^2 = \sum_{t=t_0}^{t_1} \left( \sum_{i=0}^{p} \alpha_i x_{t-i} \right)^2 = \sum_{t=t_0}^{t_1} \sum_{i=0}^{p} \sum_{j=0}^{p} \alpha_i \alpha_j x_{t-i} x_{t-j} \quad (3)$$

In equation (3), $\alpha_0 = 1$. Equation (4) is then used to simplify equation (3).

$$c_{ij} = \sum_{t=t_0}^{t_1} x_{t-i} x_{t-j} \quad (4)$$

The linear prediction coefficient $\alpha_i$ which minimizes equation (3) can be determined by setting a partial difference with respect to $\alpha_j$ (j=1, 2, . . . , p) in equation (3) to 0. As a result, equation (5) is obtained.

$$\frac{\partial}{\partial \alpha_i} \sum_{t=t_0}^{t_1} \varepsilon_t^2 = \frac{\partial}{\partial \alpha_i} \left( \sum_{i=0}^{p} \sum_{j=0}^{p} \alpha_i c_{ij} \alpha_j \right) = 2 \sum_{i=0}^{p} \alpha_i c_{ij} \quad (5)$$

Equation (5) indicates that $\alpha_i$ can be determined by solving p sets of linear simultaneous equations. $c_{ij}$ in equation (5) can be acquired using $x_{t-i}$ (i=1, 2, . . . , p).

If $\alpha_i$ is determined according to equation (5), $\Sigma \epsilon_t^2$ is minimized. In such a case, the value of $x_t$ can be approximated as equation (6), using equation (2).

$$x_t \approx -\sum_{i=1}^{p} \alpha_i x_{t-i} \quad (6)$$

If the approximation is sufficiently appropriate, the right-hand side of equation (6) can be used as the prediction signal instead of $x_t$.

Further, an approximation value of $x_{t+1}$ can be similarly acquired from a neighborhood p−1 sample values and the signal acquired by performing prediction.

The signal in the prediction section can thus be generated by sequentially repeating the above-described process. According to the present exemplary embodiment, the operation for acquiring the approximation of the prediction section from the obtained $\alpha_i$ will be referred to as the prediction operation.

The learning operation and the prediction operation will be described below using the examples of the waveforms illustrated in FIGS. 6A-6C. As illustrated in FIGS. 6A-6C, the signal previous and subsequent to the prediction section is used in performing the learning operation. Such a process uses the characteristic of the audio signal, i.e., repeatability is comparatively high within an extremely short time range. Referring to FIGS. 6A-6C, a section previous in terms of time to the section in which the drive noise is existent is set as a learning section 1. A section subsequent in terms of time to the section in which the drive noise is existent is set as a learning section 2.

In each of the learning operation and the prediction operation, the calculations are separately performed with respect to the signal in the learning section 1 and signal in the learning section 2. Generating the signal in the prediction section after performing the learning operation in the learning section 1 will be referred to as prediction from the fore, i.e., forward prediction. On the other hand, generating the signal in the prediction section after performing the learning operation in the learning section 2 will be referred to as prediction from the back, i.e., backward prediction. The forward prediction and the backward prediction are weighted in calculating the signal in the prediction section. More specifically, the nearer to the learning section 1, the greater the value acquired by performing forward prediction is weighted. The nearer to the learning section 2, the greater the value acquired by performing backward prediction is weighted.

As described above, the frequency analysis is performed for a predetermined period based on the drive signal, and the noise cancellation processing section is determined. As a result, it becomes unnecessary to constantly perform the frequency analysis, so that the calculation load is reduced. Further, it becomes unnecessary to include a separate noise detection unit, so that cost reduction, simplification of a chassis structure, and power saving can be realized. Furthermore, the drive noise generation section can be accurately detected, so that noise cancellation performance can be improved. In particular, the drive noise generation section can be accurately determined by performing the noise cancellation process using the prediction process, so that prediction accuracy can be improved.

According to the present exemplary embodiment, the drive noise cancellation process is performed with respect to the diaphragm drive noise. However, the present invention can also be applied to the cancellation of drive noise generated due to driving other optical elements. In general, the present invention can be applied to cases where the drive noise or generation timing of the noise can be detected by the operation button or the camera control unit. For example, the present invention can be applied to driving of the focus lens, the camera-shake correction lens, and a lock mechanism of the camera-shake correction lens (not illustrated). Further, the present invention can be applied to driving of image sensor shift-type camera-shake correction, driving of an electronic zoom lens, and wobbling driving of the image sensor. Furthermore, the present invention can be applied to pressing of an operating button and a pop-up driving of a flash which generate operation noise.

The noise cancellation method according to the present exemplary embodiment employs the prediction process which predicts from the audio signal generated previous and subsequent to the drive noise generation section and reproduces the audio signal in the drive noise generation section. However, other methods may be used, such as a mute method in which the signal in the drive noise generation section is set to 0 to be mute. Further, the spectral subtraction method which transforms the signal to the frequency domains and calculates the difference between the characteristic frequencies may be used.

If the mute method is employed, the audio signal in the noise generation section is simply set to 0, so that the calculation load is extremely small. Further, a hearer has less feeling of strangeness when a silent period due to muting is short, so that it is effective to correctly acquire the noise generation section as described in the present invention.

If the spectral subtraction method is employed, information acquired by recording only the drive noise and transforming to the frequency domain is previously recorded. The noise is cancelled by subtracting only the frequency domain information of the drive noise from the frequency domain information of the object audio signal into which the drive noise is mixed. In such a method, regular noise such as a humming noise can be easily cancelled. However, when sudden noise such as the diaphragm drive noise is to be cancelled, the position at which only the frequency domain information of the drive noise is subtracted from the actual section into which the drive noise is mixed may be shifted with respect to time. The noise cancellation performance is thus lowered. As a result, it is effective to correctly acquire the noise generation section as described above according to the present invention, even when the spectral subtraction method is to be used.

The second exemplary embodiment will be described below. According to the above-described exemplary embodiment, the drive noise is cancelled when the sound is captured. However, the drive noise can be cancelled after capturing the sound. More specifically, the signal indicating the generation timing of the drive noise is recorded along with the audio signal into which the drive noise is mixed. Both signals are then transferred to the drive noise cancellation apparatus, and the drive noise is cancelled. The data indicating the characteristic of the drive noise may also be recorded at the same time and be transferred to the drive noise cancellation apparatus. Such data indicating the characteristic of the drive noise includes a type of the drive noise, a threshold value for determining the drive noise period, and the period in which the drive noise continues.

Figure 9:
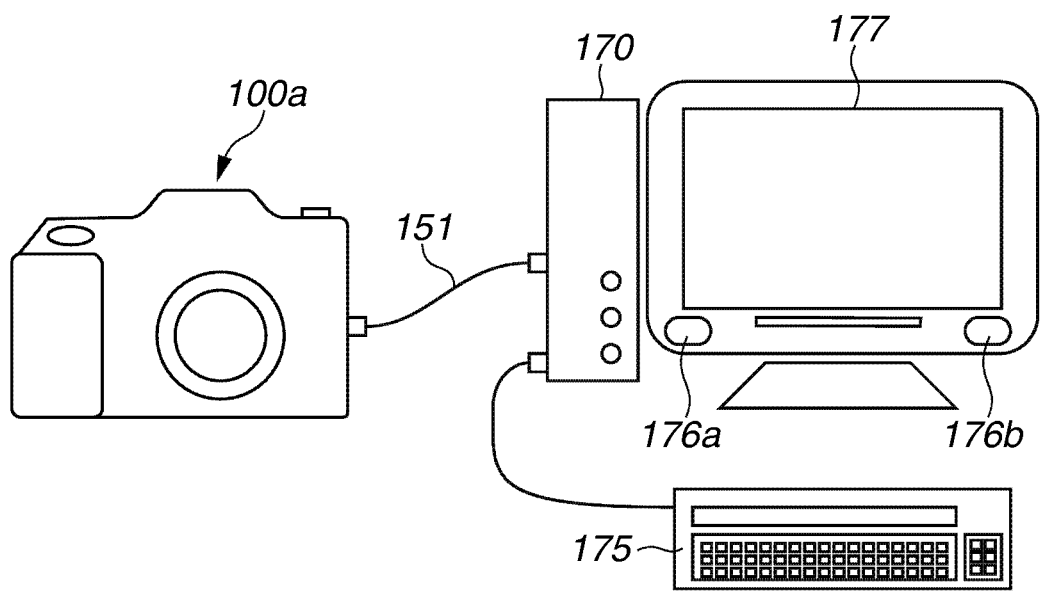
FIG. 9 illustrates a system configuration according to a second exemplary embodiment.
Figure 10:
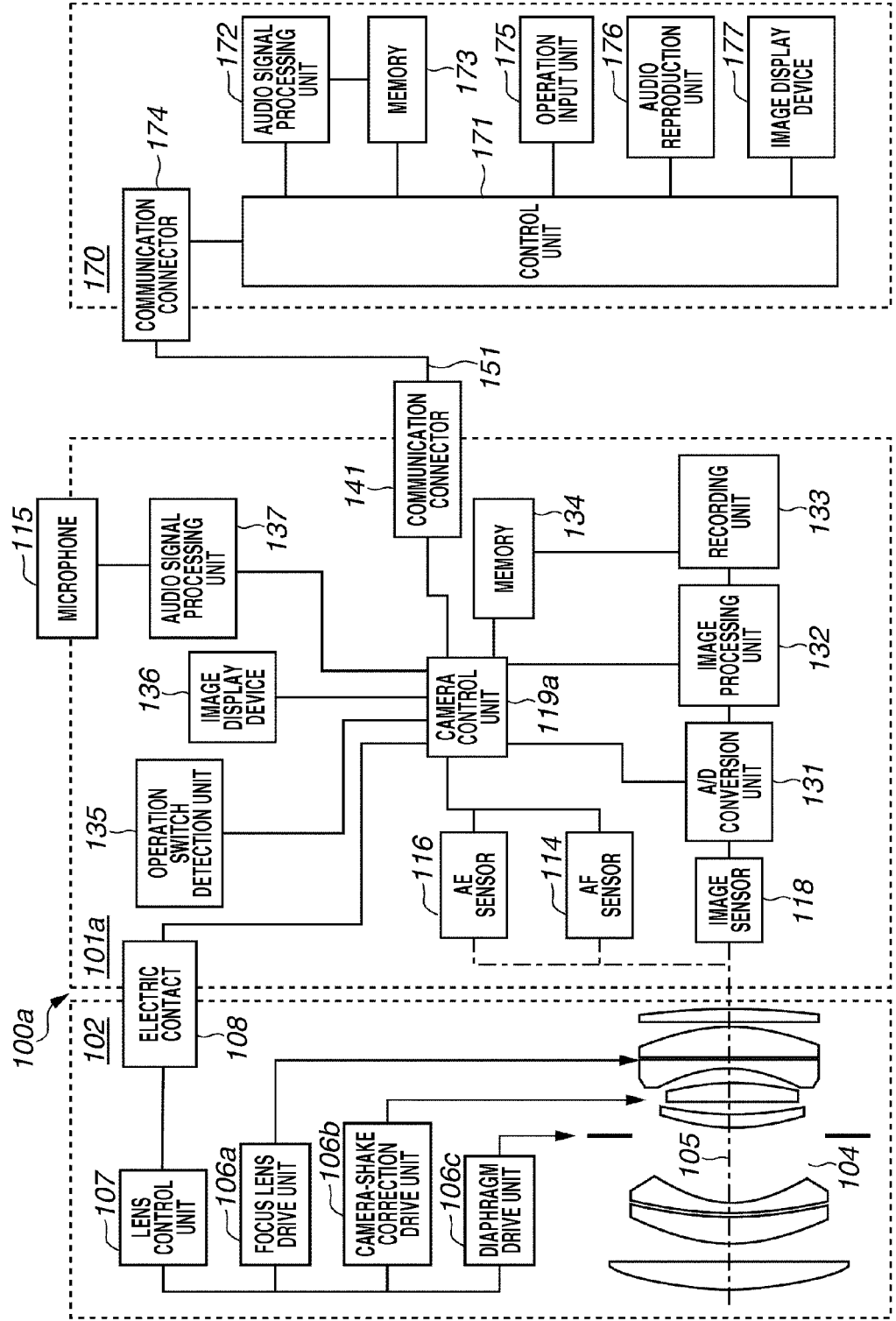
FIG. 10 is a block diagram illustrating a schematic configuration of the system illustrated in FIG. 9.

FIG. 9 is a schematic diagram illustrating a system including the digital single-lens reflex camera and an external processing apparatus, i.e., a drive noise cancellation apparatus. Referring to FIG. 9, a digital single-lens reflex camera 100a is connected to an external processing apparatus 170 via a communication cable 151. FIG. 10 is a block diagram illustrating the system configuration illustrated in FIG. 9. Referring to FIG. 10, the camera 100a includes a communication connector 141 for connecting to an external device. The communication connector 141 electrically connects to a communication connector 174 in the external processing apparatus 170 via the communication cable 151. The elements having similar functions as those in the first exemplary embodiment are assigned the same reference numerals.

The external processing apparatus 170 includes a control unit 171, an audio signal processing unit 172, a memory 173, an operation input unit 175, an audio reproduction device 176, and an image display device 177.

The control unit 171 controls each unit to perform operations including noise cancellation according to the operation on the operation input unit 175 by an operator. The results of performing control including an operation status of noise cancellation are output to the audio reproduction unit 176 and the image display device 177.

In the noise cancellation process, the control unit 171 receives from the camera 100a via the communication connector 174, recorded moving image data including the audio signal in which the drive noise has not been cancelled, and the signal indicating the drive noise generation timing. The audio signal processing unit 172 then performs the noise cancellation process similar to the first exemplary embodiment on the audio signal which includes the drive noise received from the camera 100a, and records the processed signal in the memory 173.

Figure 11:
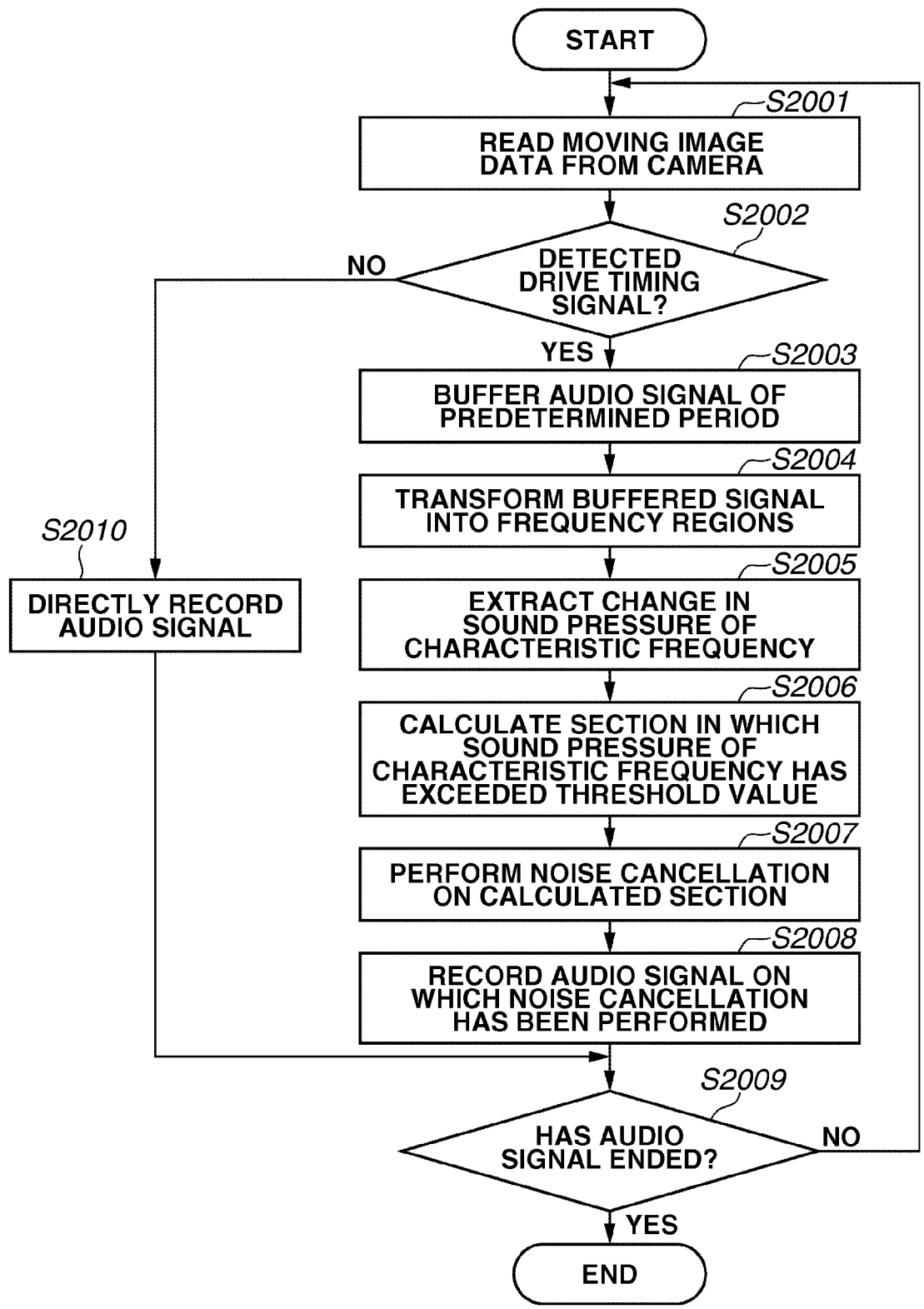
FIG. 11 is a flowchart illustrating the noise cancellation process performed by an external processing apparatus.

FIG. 11 is a flowchart illustrating the drive noise reduction process performed by the external processing device 170. The flowchart illustrated in FIG. 11 starts when the operator instructs the control unit 171 via the operation input unit 175 to start the noise cancellation process.

In step S2001, the external processing device 170 reads via the communication cable 151, the audio signal into which the drive noise is mixed, and the moving image data including the drive timing signal recorded in the memory 134 in the camera body 101a.

In step S2002, the control unit 171 determines whether the drive timing signal which is in synchronization with the read audio signal is detected. If the control unit 171 does not detect the drive timing signal which is in synchronization with the read audio signal (NO in step S2002), the process proceeds to step S2010. In step S2010, the control unit 171 directly records the audio signal. In step S2009, the control unit 171 determines whether the audio signal to be processed has ended. If the audio signal has not ended (NO in step S2009), the process returns to step S2001, and the control unit 171 continues to read the audio signal from the camera 100a. If the audio signal has ended (YES in step S2009), the control unit 171 ends the drive noise cancellation process.

On the other hand, if the control unit 171 detects the drive timing signal which is in synchronization with the read audio signal (YES in step S2002), the process proceeds to step S2003. In step S2003, the control unit 171 buffers the audio signal of a predetermine length of time from a point of receiving the drive timing signal. The processes performed in step S2004 to step S2007 are similar to those performed in step S1004 to step S1007 illustrated in FIG. 3 except for the audio signal processing unit 172 performing the noise reduction process. Detailed description will thus be omitted.

In step S2008, the speech signal processing unit 172 records in the memory 173 the audio signal on which the noise cancellation process has been performed. In step S2009, the control unit 171 determines whether the audio signal to be processed has ended. If the audio signal has not ended (NO in step S2009), the process returns to step S2001, and the control unit 171 continues to read the audio signal from the camera 100*a*. If the audio signal has ended (YES in step S2009), the control unit 171 ends the drive noise cancellation process.

The audio signal on which the noise cancellation process has been performed is recorded in the memory 173 in synchronization with the image data included in the moving image data received from the camera 100*a*. The audio signal on which the noise cancellation process has been performed may be re-written in the memory 134 in the camera 100*a* and be overwritten on the audio signal in the memory 134 which includes the drive noise.

Figure 12:
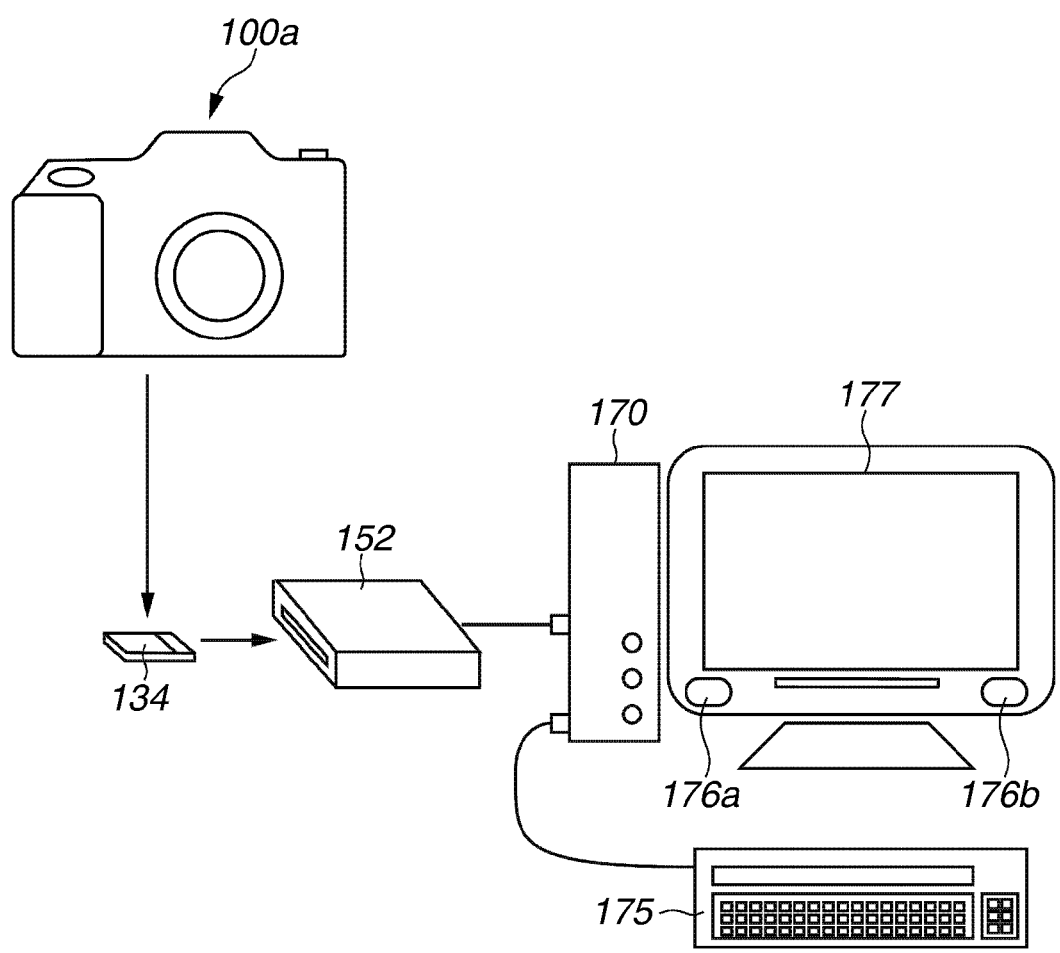
FIG. 12 illustrates a configuration of a system in which the audio signal is transferred by detaching a memory.

If the memory 134 can be detached from the camera body 101*a*, a memory card reader 152 may be used to transfer the necessary data to the external processing apparatus as illustrated in FIG. 12.

Other Embodiment

Apparently, the present invention can be accomplished by supplying an apparatus with a storage medium in which a software program code which implements the functions of the above exemplary embodiments is stored. In this case, a computer (or central processing unit (CPU), micro-processor unit (MPU) and/or the like) including a control unit of the apparatus supplied with the storage medium reads out and executes the program code stored in the storage medium. In this case, the program code itself read from the storage medium implements the functions of the above exemplary embodiments. Thus, the program code itself and the storage medium in which the program code is stored constitute the present invention. For example, a flexible disk, a hard disk, an optical disk, a magneto-optical disk, a compact disc read-only memory (CD-ROM), a compact disc recordable (CD-R), a magnetic tape, a nonvolatile memory card, and a ROM can be used as the storage medium for supplying the program code.

In addition, apparently, the above case includes a case where a basic system or an operating system (OS) or the like which operates on the computer performs a part or all of processing based on instructions of the above program code and where the functions of the above exemplary embodiments are implemented by the processing.

Besides, the above case also includes a case where the program code read out from the storage medium is written to a memory provided on an expansion board inserted into a computer or to an expansion unit connected to the computer, so that the functions of the above exemplary embodiments are implemented. In this case, based on instructions of the program code, a CPU or the like provided in the expansion board or the expansion unit performs a part or all of actual processing.

Aspects of the present invention can also be realized by a computer of a system or apparatus (or devices such as a CPU, MPU, etc.) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-264119 filed Nov. 26, 2010, which is hereby incorporated by reference herein in its entirety.

What is claimed is:

1. An imaging apparatus comprising:
   an imaging unit that generates an image signal corresponding to an image obtained by an optical system;
   an audio obtaining unit that obtains an audio signal; and
   a control unit that controls a driving operation of a component of the optical system so as to start driving in accordance with a drive start instruction, to drive for a predetermined driving period, and to stop driving after the predetermined driving period;
   a determination unit that determines a noise period in which a noise is included in the audio signal obtained by the audio obtaining unit,
   where the determination unit performs an operation for determining the noise period in an analysis period which includes a determined period from a driving stop timing of the component of the optical system and determines the noise period in the analysis period in accordance with the obtained audio signal in the analysis period; and
   an audio processing unit that reduces a noise from the audio signal in the noise period determined by the determination unit.

2. The imaging apparatus according to claim 1, wherein the control unit determines the analysis period based on a type of a lens unit which includes the optical system.

3. The imaging apparatus according to claim 1, wherein the control unit determines the analysis period based on a type of the component of the optical system.

4. The imaging apparatus according to claim 1, wherein the audio processing unit reduces the noise of the audio signal in the noise period by processing the audio signal in the noise period using a prediction signal generated in accordance with the audio signal before or after the noise period.

5. The imaging apparatus according to claim 1, wherein the determination unit stops performing, in another period than the analysis period, an operation for determining the noise period.

6. The imaging apparatus according to claim 1, wherein the determination unit converts the audio signal in the analysis period into a frequency domain and determines the noise period in accordance with a sound pressure of a predetermined frequency component of the audio signal in the analysis period.

7. The imaging apparatus according to claim 1, wherein the predetermined frequency component corresponds to 10 kHz.

8. The imaging apparatus according to claim 1, wherein the component of the optical system includes a diaphragm mechanism.

9. The imaging apparatus according to claim 1, wherein the component of the optical system includes a focus lens unit.

10. The imaging apparatus according to claim 1, wherein the drive unit includes a direct current motor or an ultrasonic motor.

11. The imaging apparatus according to claim 1, further comprising:
    a connector configured to connect with the optical system.

12. The imaging apparatus according to claim 1, further comprising:
    a recording unit that records image data and audio data on a recording medium, wherein the image data corresponds to the image signal, and the audio data corresponds to the audio signal from which drive noise is reduced.

13. The imaging apparatus according to claim 12, wherein the recording unit compresses the image data and the audio data before the image data and the audio data are recorded on the recording medium.

14. The imaging apparatus according to claim 1, wherein the imaging apparatus includes a camera.

15. The imaging apparatus according to claim 14, wherein the camera includes a single lens reflex camera.

16. A method comprising:
    causing an imaging unit to generate an image signal corresponding to an image obtained by an optical system;
    causing an audio obtaining unit to obtain an audio signal;
    controlling a driving operation of a component of the optical system so as to start driving in accordance with a drive start instruction, to drive for a predetermined driving period, and to stop driving after the predetermined driving period;
    determining a noise period in which a noise is included in the audio signal obtained by the audio obtaining unit,
    where the determining performs an operation for determining the noise period in an analysis period which includes a determined period from a driving stop timing of the component of the optical system and determines the noise period in the analysis period in accordance with the obtained audio signal in the analysis period; and
    reducing a noise from the audio signal in the noise period determined by the determining.

17. A non-transitory computer-readable storage medium that stores a program for causing a computer to execute a method comprising:
    causing an imaging unit to generate an image signal corresponding to an image obtained by an optical system;
    causing an audio obtaining unit to obtain an audio signal;
    controlling a driving operation of a component of the optical system so as to start driving in accordance with a drive start instruction, to drive for a predetermined driving period, and to stop driving after the predetermined driving period;
    determining a noise period in which a noise is included in the audio signal obtained by the audio obtaining unit,
    where the determining performs an operation for determining the noise period in an analysis period which includes a determined period from a driving stop timing of the component of the optical system and determines the noise period in the analysis period in accordance with the obtained audio signal in the analysis period; and
    reducing a noise from the audio signal in the noise period determined by the determining.

* * * * *